AUTOMATIC CORRELATING INTERFEROMETER

Filed Feb. 9, 1968 5 Sheets-Sheet 1

GILBERT L. HOBROUGH
INVENTOR.

BY Robert L. Nathans

ATTORNEY.

GILBERT L. HOBROUGH
INVENTOR.

BY
Robert L. Mathews
ATTORNEY.

AUTOMATIC CORRELATING INTERFEROMETER

Filed Feb. 9, 1968 5 Sheets-Sheet 3

GILBERT L. HOBROUGH
INVENTOR.

BY Robert L. Nathans
ATTORNEY.

Sept. 8, 1970 G. L. HOBROUGH 3,527,537

AUTOMATIC CORRELATING INTERFEROMETER

Filed Feb. 9, 1968 5 Sheets-Sheet 4

GILBERT L. HOBROUGH
INVENTOR.

BY Robert L. Mathews

ATTORNEY.

AUTOMATIC CORRELATING INTERFEROMETER

Filed Feb. 9, 1968 5 Sheets-Sheet 5

GILBERT L. HOBROUGH
INVENTOR.

BY Robert L. Nathans
ATTORNEY.

United States Patent Office
3,527,537
Patented Sept. 8, 1970

3,527,537

AUTOMATIC CORRELATING INTERFEROMETER

Gilbert L. Hobrough, Woburn, Mass., assignor to Itek Corporation, Lexington, Mass., a corporation of Delaware Filed Feb. 9, 1968, Ser. No. 704,440
Int. Cl. G01b 9/02
U.S. Cl. 356—106 21 Claims

ABSTRACT OF THE DISCLOSURE

This invention concerns the automatic reading and interpretation of the fringe pattern obtained from an interferometer in the testing of an optical component. Electronic techniques are used with the interference patterns being scanned using a television type camera. The signals derived from the television camera are analyzed by electronic circuitry to be described, and the resulting error signals are used to modify both the settings of the interferometer and the shape of the scanning raster waveform in such a manner that the video signal from the TV camera becomes identical to the signal that would be produced if the optical component under test were of precisely the required shape. The transformation of the raster required to produce this condition is thus directly related to the perturbations of the optical surface under test. An alternative application of the automatic correlating interferometer is in the use of the so-called active-mirror systems. In such a system the surface of a large reflecting objective is examined by means of an unequal-path-interferometer while the objective is in use, forming an image on a photosensitive surface. The automatic correlation system senses perturbations in the surface of the mirror and delivers error-signals to mechanical actuators that are attached to the mirror and which exert corrective forces on the mirror in response to the error signals. In this way peturbations are reduced to a negligible level through a multiple closed-loop feedback process. Observation of the interference pattern is by means of the television camera and a TV type raster is employed with the scanning lines perpendicular to the direction of the fringes. The correlator performs two separate functions in the interpretation of the interferometer fringe pattern. Firstly, the fringe patterns is normalized for pitch, orientation with respect to the scanning raster, and for straightness of the fringes. Such normalizing is accomplished through feedback to the X, Y and Z adjustments of the interferometer or their equivalents. The interferometer adjustments are equipped with servo-motors for this purpose, which motors respond to the amplified error signals derived from the correlation circuitry. After normalization, the fringes, as seen by the TV camera, will be straight, of predetermined pitch, and will lie perpendicular to the direction of the scanning lines. Irregularities in the pattern owing to perturbations in the mirror surface from the ideal form required for the production of straight fringes will remain however. The second function of the automatic correlating interferometer (ACI) is the conversion of the residual pattern irregularity signals into an error matrix representing the perturbations of the miror surface causing the irregularities.

SUMMARY OF ONE EMBODIMENT OF THE INVENTION

Figure 1:
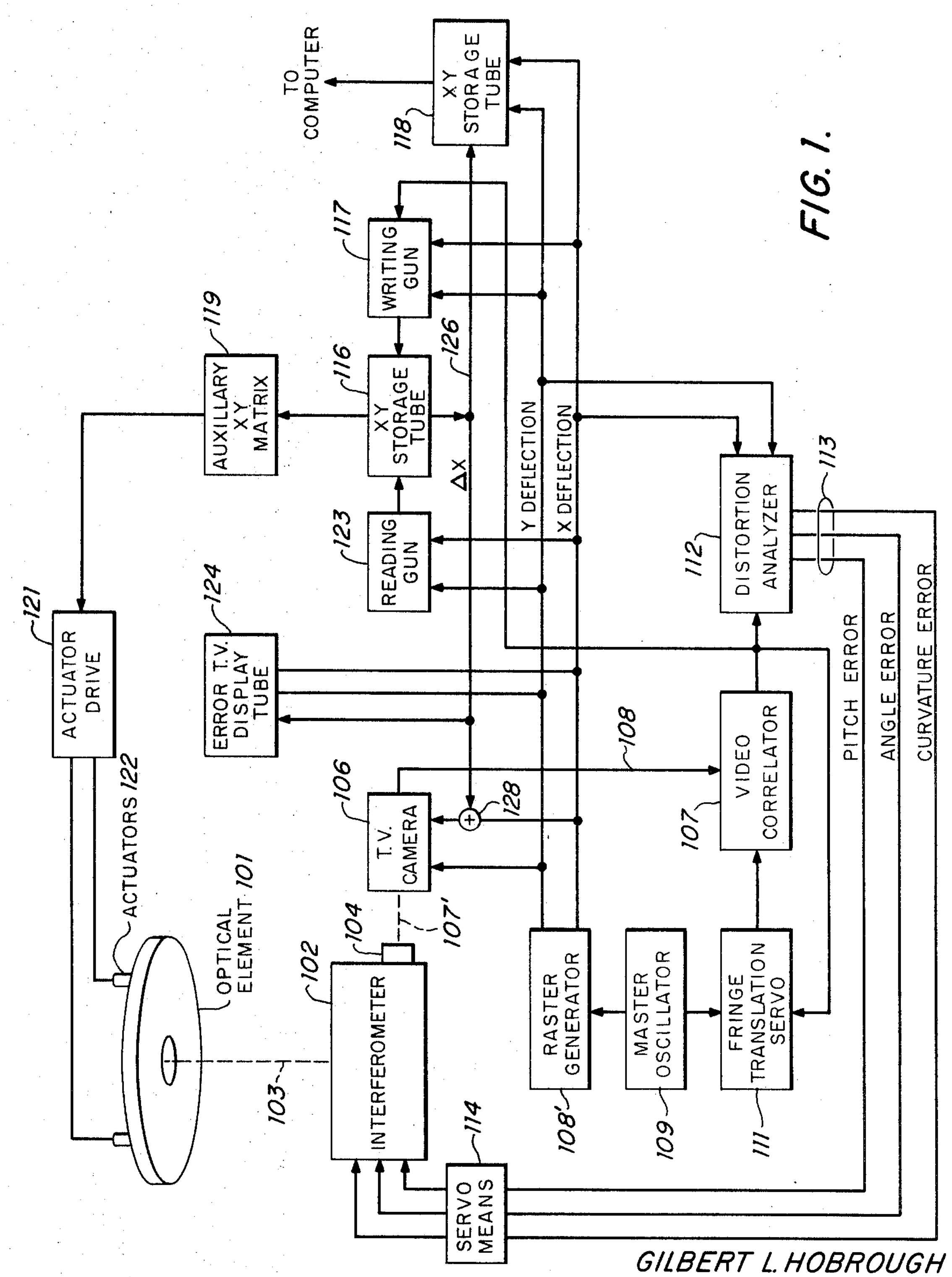

In FIG. 1 an optical element 101, such as a large mirror, is optically coupled to interferometer 102 as indicated by dashed line 103. An interference pattern is generated as is well known to those skilled in the art at viewing port 104 which in turn is coupled to the input of TV camera 106 as indicated by dashed line 107'. Raster generator 108' produces conventional saw-tooth wave forms for the X and Y deflection coils of camera 106 so that comera 106 sequentially scans incremental portions of the interference pattern and produces a video signal which is applied to video correlator 107 over output lead 108. Raster generator 108' is controlled by master oscillator 109 as will be explained in greater detail hereinafter. The sinusoidal wave shape produced by master oscillator 109 is applied to video correlator 107 through fringe translation servo circuitry 111. Video correlator 107 applies signals to distortion analyzer 112 which are indicative of instantaneous phase discrepancies between the sinusoidal references wave shape produced by master oscillator 109 and the wave shape produced by the output circuit of TV camera 106. The output signals from correlator 107 will have a D.C. component where the pattern detected by camera 106 is translationally displaced from the synthetic pattern produced by oscillator 109 to be explained in greater detail hereinafter. This D.C. component is utilized by servo circuit 111 to phase shift the signal from master oscillator 109 in a direction and to the extent necessary to cause superposition of the waveforms.

Video correlator 107 also produces undulating positive and negative signals which indicate incremental leading and lagging relationships between the video waveforms applied to correlator 107 which indicate incremental phase discrepancies between corresponding portions of the interference pattern scanned by camera 106 and the reference pattern synthetically generated electronically by master oscillator 109. These signals are applied to distortion analyzer 112 which contains logic circuitry for comparing these signals against the X and Y deflection signals which function as a reference. The error signals are impressed upon output busses 113 of distortion analyzer 112 which indicate errors or discrepancies in pitch or frequency, angle, and curvature between the synthetically generated reference pattern and the actual interference pattern scanned. These error signals are applied to servo means 114 which drive the interferometer 102 to normalize it in a manner well known to those skilled in the art. Normalization of the interferometer causes changes in the pitch, angle, and curvature of the scanned interference pattern in directions and to the extent which eliminate these discrepancies.

However, although the aforesaid patterns are now roughly superimposed, the scanned interference pattern will still have irregular wiggles at various coordinate points which correspond to perturbations of the optical surface of element 101 which still produces leading and lagging phase shifts between the signals applied to video correlator 107. The resulting undulating positive and negative signals are written into XY storage tube 116 by writing gun 117 and accordingly positive and negative charges will be stored in storage tube 116 having various values which correspond to perturbation errors at corresponding points of optical element 101. These error signals may be applied to an auxiliary XY storage tube 118 and may be read out at will into a computer, not shown, which could for example control an automatic optical lapping machine or could produce a map of the perturbations. These output error signals could additionally be applied to a storage matrix 119 and actuator drive means 121 which in turn could control actuators 122. Such actuators comprising hydraulic or pneumatic transducers, could push or pull on various coordinate points of element 101 in directions to eliminate the aforesaid perturbation errors. Reading gun 123 may be employed to read out the instantaneous parallax (delta X) perturbation errors signals and could apply them to TV display tube 124 via conductor 126 to generate a visual topographical map of the perturbations of optical element 101. It is desirable to utilize these signals to velocity modulate the horizontal sweep of camera 106 to largely eliminate the incremental wave displacements produced by the perturbations. This is important to ensure correlation of the system where errors substantially greater than one quarter of a fringe may occupy a substantial area of the surface under examination. When errors in the surface being measured are less than about one quarter of a fringe, this feedback device which could utilize, for example, adder 128, might not be needed. It should be understood that for merely normalizing interferometer 102, it might not be necessary to employ the storage tubes at all. Additionally, elements 119, 121, and 122 need not be utilized unless the system is employed in a feedback system for controlling an "active" or deformable optical element.

FIG. 1 discloses an over-all schematic diagram illustrating an embodiment of the invention.

FIGS. 2 through 5 illustrate details of the embodiment disclosed in FIG. 1.

Figure 6:
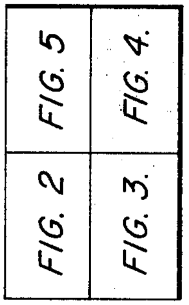

FIG. 6 indicates how FIGS. 2–5, illustrating an embodiment of the invention, should be arranged.

Figure 2:
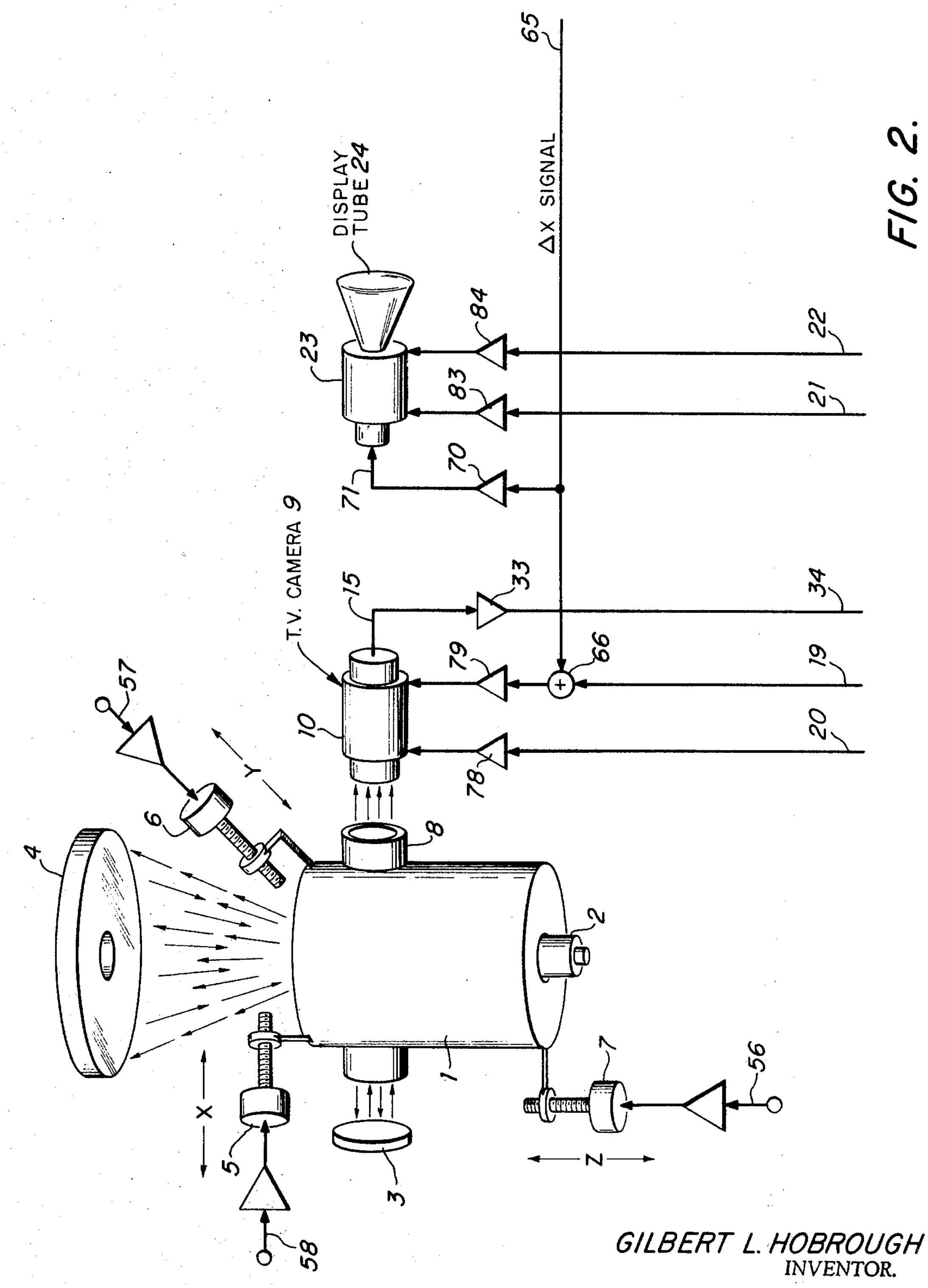
Figure 3:
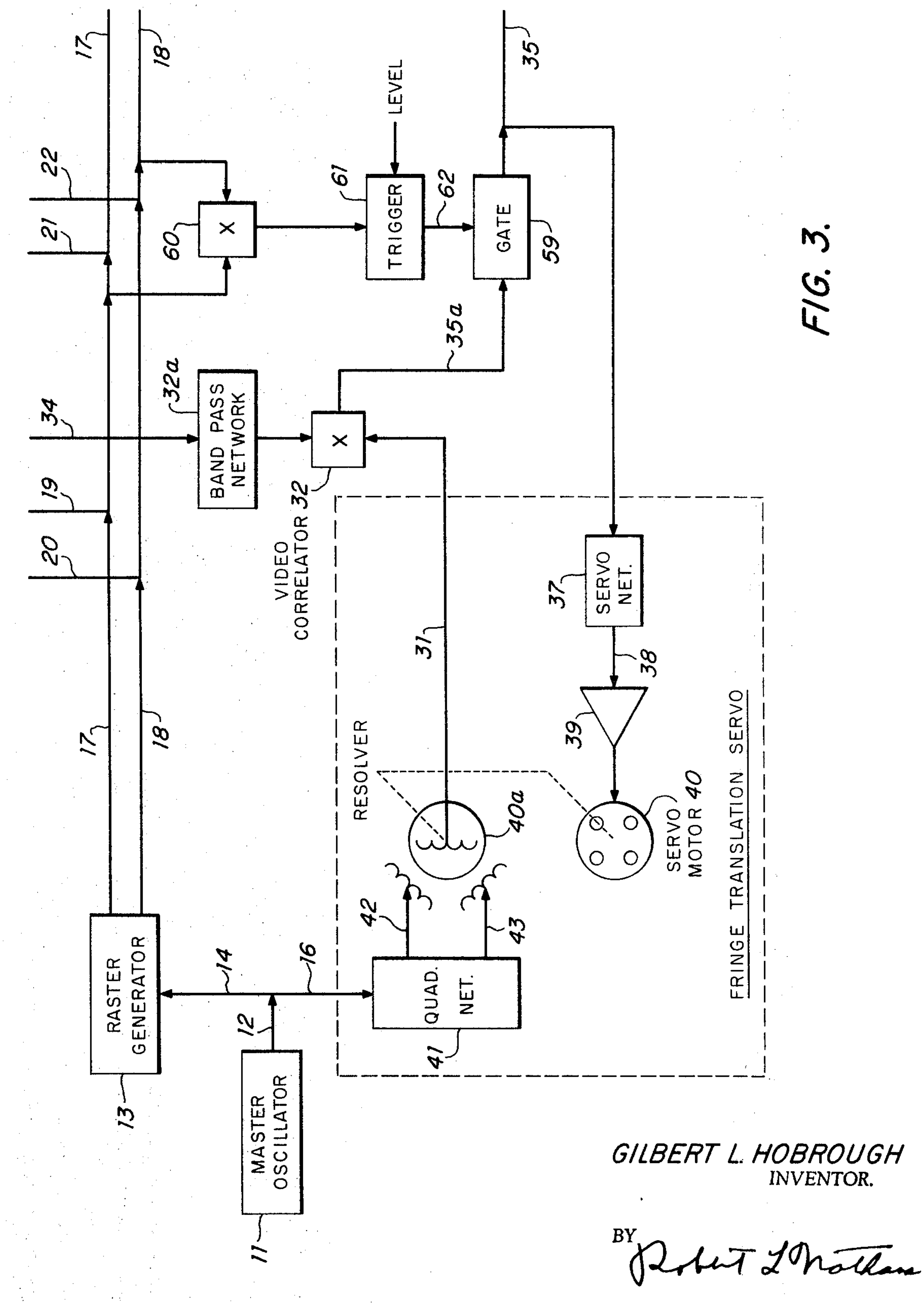
Figure 4:
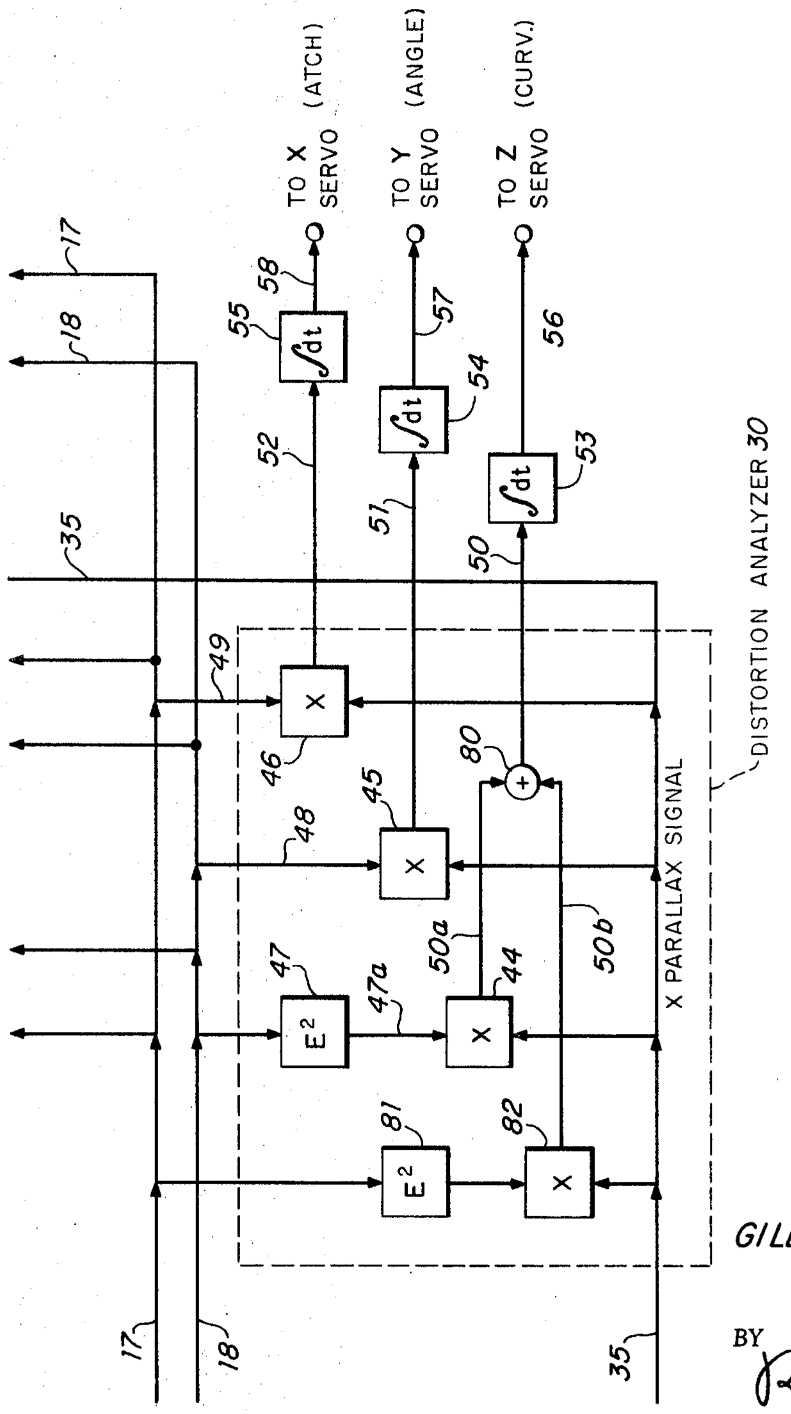
Figure 5:
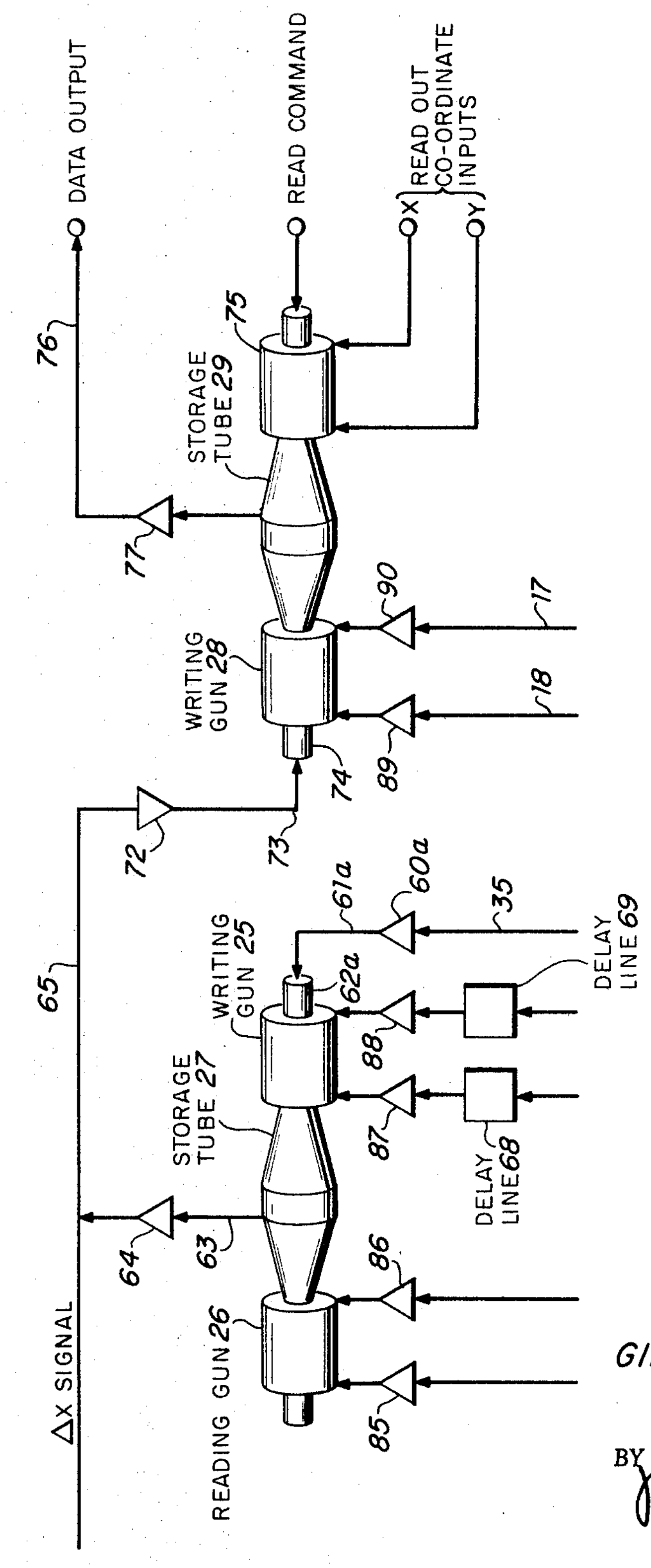

Referring to FIG. 2, the numeral 1 indicates a "Laser-Unequal-Path-Interferometer" with the laser at 2, the reference reflecting surface at 3, and the mirror under test at 4. The X, Y, Z motions of the interferometer body are shown schematically as being actuated by the servomotors 5, 6, and 7 respectively. Light reflected from the surface of the mirror 4 and from the reference deflection 3 are combined in a beam splitter within the interferometer, and is directed outward from the port 8 into the TV camera tube 9. The camera tube 9 is surrounded by a deflection coil assembly 10 in the conventional manner.

The oscillator 11 generates a one megahertz sinusoidal reference signal on line 12, that is delivered to the raster generator 13 by means of line 14 and to the quadrature network 41 by means of line 16. The raster generator 13 contains a series of frequency division circuits. The one megahertz timing signal is thereby divided by 50 to yield a 20 kilohertz signal and by 5,000 to yield a 200 hertz signal. The waveform of the 20 kilohertz signal is processed into a triangular shape within the rastor generator and delivered on the output line 17. Similarly the 200 hertz signal is shaped into triangular waveform and delivered on output line 18. The waveforms on lines 17 and 18 are the basic scanning raster deflection signals used throughout the ACI and are delivered through lines 19 and 20 through deflection amplifiers 78 and 79 to the horizontal and vertical deflection coils 10 or the TV camera. The deflection signals on lines 17 and 18 are also delivered by means of lines 21 and 22 through deflection amplifiers 83 and 84 to the deflection coils 23 of the display cathode tube 24. Similarly the deflection signals are delivered through deflection amplifiers 85, 86, 87 and 88 to the writing gun deflection coils 25 and to the reading gun deflection coils 26 of the graphicon storage tube 27. The deflection signals on lines 17 and 18 are also delivered through deflection amplifiers 89 and 90 to the deflection coils 28 of the writing gun of storage tube 29, and lastly to the distortion analyzer 30.

The one megahertz reference signal from the master oscillator is delivered through line 16, through the fringe translation servo to be described and via line 31 to the video correlator 32. The video output signal from the TV camera tube 9 is delivered through line 15 to the preamplifier 33 and via line 34 the band-pass-network 32*a* to the multiplier 32. The multiplier 32 delivers on line 35 an output signal representing the instantaneous product of the signals on lines 34 and 31. As will be shown later, the video signal on line 34 will be a sine wave of close to one megahertz frequency, and the band-pass filter 32*a* removes noise components in the video signal on line 34. The output signal on line 35*a* is the instantaneous X parallax signal, which will be described later, and is delivered through the gate 59 and line 35 to the multipliers in the distortion analyzer 30, to writing gun 25 of storage tube 27, and through the servo network 37, and via line 38 to the servo amplifier 39. The servo amplifier 39 actuates the servomotor 40 causing the resolver 40*a* to rotate in a direction depending upon the polarity of the signal on the line 38. The quadrature network 41 delivers a replica of the one megahertz reference signal on line 16 to the stator windings of the resolver 40*a* through lines 42 and 43. The signals on lines 42 and 43 are in quadrature so that a rotating field with an angular frequency of 1 megahertz is setup in the resolver 40*a*. The resolver 40*a* therefore is seen to be an arrangement for the adding or subtraction of phase to the reference signal on line 16. Specifically if the rotation of the resolver rotor in response to the servo input signal on line 38 is in the same direction as that of the rotating field, then one cycle will be subtracted for each revolution of the resolver and a new reference signal of reduced frequency will be made available on line 31. Conversely if the signal on line 38 is of opposite polarity so that the resolver rotor is caused to rotate in a direction opposite to that of the rotating field then one cycle will be added to the reference signal per revolution of the resolver and a new reference signal of increased frequency will be made available on line 31.

The distortion analyzer 30 contains the multipliers 44, 45, 46 and 82 and squaring circuits 47 and 81. Multipliers 45 and 46 recieve via lines 48 and 49 respectively the 200 hertz waveform on line 18 and the 20 kilohertz waveform on line 17 also respectively. The squaring circuit 47 delivers to multiplier 44 a waveform representing the instantaneous value of the vertical scanning waveform on line 18 squared. Similarly the squaring circuit 81 delivers to multiplier 82 a waveform representing the instantaneous value of the horizontal waveform on line 18 squared. The outputs of the multipliers 44, 45, 46 and 82 are delivered through lines 50, 51 and 52 respectively to the three integrating circuits 53, 54 and 55, the outputs of multipliers 82 and 44 being first summed at 80. The three integrators deliver on lines 56, 57 and 58, smoothed replicas of the signals on lines 50, 51 and 52 respectively which signals represent errors in the normalizing of the interference pattern, as will be described, and the three error signals are delivered to the amplifiers which in turn drive the servo-motors 7, 6, and 5 respectively, correctively to reposition the laser interferometer.

All error signals are derived from the X parallax signal on line 35 from the multiplier 32. Minimum or zero signal amplitude on line 35 implies that the input signals to the multiplier on lines 31 and 34 are of identical freqency and in phase quadrature. Since the signal on line 31 is substantially the one megahertz signal derived from the master oscillator 11, the video signal on line 34 would, therefore, be of the same frequency. Departure of the video signal on line 34 from the nominal value of one megacycle will cause an undulating signal to appear on line 35*a* having a frequency equal to the difference in frequencies between the one megacycle reference signal, and the video signal on line 34. Similarly a video signal on line 34 having a frequency of one megacycle but not in phase quadrature with the signal on line 31, will produce a DC signal on line 35.

In order to describe the normalizing action of the correlation circuitry we will consider the reaction of the circuitry to errors in the fringe pattern such as phase, pitch, slope and curvature, each taken separately and with the assumption that all other errors are zero. Since a correlator such as that being described is in general unable to sense any errors in image registration, if one error becomes excessive, the logical question is raised as to how such a correlation system can become operative in the first place with all errors reduced to a value consistent with the onset of correlation. The solution to this problem turns out to be quite simple and will be dealt with after the operation of the various error sensing modes is described.

The parameters given so far imply that the fringe pattern will contain 50 cycles in the scanned area and that the number of scanning lines in the raster will be 100. This implies in turn that $10^4$ elements will be examined each time the complete raster is scanned and that the rate of raster scanning or frame rate will be 200 per second. The resulting video frequency will be 1 megahertz and, if the fringes are straight and normal to the scanning lines, one megahertz will be the only signal component on the video line 39 and delivered to the multiplier 32.

We will consider first the normalizing of fringe phase with respect to the reference signal from the master oscillator. Let us assume initially that a phase difference exists between the signals on lines 34 and 31 such that the output of the multiplier on line 35 contains a direct current component of positive polarity. This positive signal will be applied through lines 36, network 37 and line 38 to the servo output 39. The servo network 37 is a low pass network which determines the response time of the fringe translation servo system in usual way. In response to the positive potential on line 38 the servo amplifier 39 will deliver to the servomotor 40 a signal which will cause it to rotate. The rotation of the resolver causes the phase of the signal on line 31 to shift with respect to the input signal on line 16 at a rate of 360 degrees per revolution of the resolver as already described. As the phase of the signal on line 31 approaches a condition of quadrature with respect to signal on line 34 the DC output from the multiplier 32 on line 35 will be reduced and the velocity of the resolver correspondingly reduced. If the relationship between the phases on lines 31 and 39 departs from quadrature from the opposite direction to that which was just described then the DC output of the multiplier 32 will be negative and the servo-motor/resolver will be driven in the opposite direction again to reduce the departure from quadrature between the video signal on line 34 and the signal on line 31.

From the foregoing it will be seen that the correlator will be rendered insensitive to changes in phase of the fringe pattern as viewed by the camera tube. Such changes may be induced by drift in the optical path length associated with the interferometer and such changes will be compensated as they occur by a progressive phase displacement induced into the reference signal on line 16 by the fringe translation servo 15, such phase displaced signal appearing on line 31 being maintained in phase quadrature with the video signal on line 34 as described.

We will now consider the operation of the error loop that normalizes the pitch of the fringe pattern, again assuming that all other errors are held to negligible values. A fringe pitch substantially different from the nominal value of 50 fringes per raster, will produce a video signal on line 34 of a frequency higher or lower than a one megahertz reference frequency depending on whether the pitch of the fringes is smaller or greater than the nominal value respectively. A small error in fringe pitch will produce a video signal on line 34 that is phase modulated by the horizontal deflection waveform. If the error in fringe pitch is such that the phase difference across the raster between the video signal and the one megahertz reference signal exceeds about 90 degrees at the edges of the raster then the correlating system will probably not be operable. Once correlation has been achieved however, the corrective action of the pitch servo holds the pitch close to nominal so that phase shifts of more than a few degrees at the edges of the raster are unlikely.

We will consider first that the pitch of the fringe is in error in such a direction that the phase of the video signal on line 34 is leading with respect to the reference signal on line 31 at the left-hand side of the raster and lagging with respect to the reference signal on line 31 at the right-hand side of the raster. Considering the multiplier 46 it will be seen that the input signals to this multiplier are the horizontal deflection waveform on line 49, which waveform represents the position of the spot in the horizontal direction, and the X parallax signal on line 36. With the scanning spot at the left-hand side of the raster the signal on line 49 will be negative and with the spot at the right-hand side of the raster the signal on line 49 will be positive. Let us say that under the fringe-pitch-error condition described that the output of the multiplier 32 is negative when the spot at the left-hand side of the raster and positive when the spot is at the right side of the raster. Under these conditions the output of the multiplier 46 on line 52 will be positive at all times corresponding to the multiplication of quantities having the same sign. If the pitch error were of the opposite sense to that just described so that signal on line 54 was lagging when the spot is at the left of the raster and leading when the spot is at the right of the raster, then the polarity of the X parallax signal on line 36 at any instant would be opposite to the signal on line 49. Under these conditions the polarity of the output signal on line 52 will be negative corresponding to the multiplication of signals having opposite polarities. Since the multiplier 46 is proportional in its action and since the deflection waveform on line 49 is constant in amplitude, the error signal on line 52 will be proportional in amplitude and polarity to the X parallax signal on line 35 and, therefore, to the amplitude and direction of phase error between the signal on lines 24 and 31 and, therefore, also to the magnitude and direction of the fringe pitch error.

The signal on line 52 representing error in fringe pitch is smoothed by the integrating circuit 55 and smoothed error signal is delivered by line 58 to the servo amplifier that drives the X servo-motor 5 causing the interferometer to move linearly in a direction normal to the fringes. Such motion of the interferometer with respect to the object under test produces a change in the pitch of the fringe pattern in accordance with the known behavior of the unequal path interferometer. It can be seen, therefore, that by utilization of the polarity of the signals delivered to the servo-motor 5, that a corrective action can be secured and that fringe pitch errors as indicated by the signal on line 58 will be reduced to an extent depending upon the loop gain of the corrective system that can be achieved.

We will now consider the operation of the error-loop that normalizes the slope of the fringe pattern, that is to say its departure from perpendicularity with respect to the scanning lines. Again we will assume that all other errors are held to negligible values. Slope of the fringe pattern will cause the 1.0 megahertz video signal on line 34 to be phase modulated by the vertical deflection waveform. If the fringe angle is such that the phase difference between the video signal and the 1 megahertz reference signal exceeds about 90 degrees at the top and bottom of the raster, then the correlating system will probably not be operable. As in the case of the fringe pitch normalizing system, however, once correlation has been achieved, the corrective action of the fringe angle servo will hold the fringes nearly orthogonal to the scanning lines so that phase shifts of more than a few degrees at the extremes of the raster are unlikely.

We will consider first that the fringe angle is in error in such a direction that the phase of the video signal on line 34 is leading with respect to the reference signal on line 31 when the scanning spot is at the top of the raster and lagging with respect to the reference signal when the spot is at the bottom of the raster. Considering multiplier 45 it will be seen that the input signals to this multiplier are the vertical deflection waveform on line 48, which waveform represents the position of the spot in the vertical direction, and the X parallax signal on line 35. When the scanning spot is at the top of the raster the signal on line 48 will be positive and when the spot is at the bottom of the raster the signal on line 48 will be negative. Let us say that, under the fringe angle error condition just described, the output of the multiplier 32 is positive when the spot is at the top of the raster, and negative when the spot is at the bottom of the raster. Under these conditions the output of the multiplier 45 will be positive at all times corresponding to the multiplication of quantities having the same sign. If the fringe angle error were of the opposite sense to that just described so that the signal on line 34 was lagging when the spot is at the top of the raster and leading when the spot is at the bottom of the raster, then the polarity of the X parallax signal on line 35 at any instant would be opposite to the signal on line 48. Under these conditions the polarity of the signal on line 51 will be negative corresponding to the multiplication of signals on lines 48 and 35 having opposite polarity. Since the deflection waveform on line 48 is constant in amplitude, the error signal on line 51 will be proportional in amplitude and polarity to the X parallax signal on line 35 and therefore to the amplitude and direction of phase error between the signals on lines 34 and 31 and therefore also to the magnitude and direction of the fringe angle error.

The signal on line 51 is smoothed by the integrating circuit 54 and a smoothed error-signal, representing the departure of the fringe pattern from perpendicularity to the scanning lines, is delivered by line 57 to the servo amplifier that drives the Y servo motor 6, causing the interferometer to move linearly in the direction parallel to the fringes. Such motion of the interferometer with respect to the object under test produces a change in the angle of the fringe pattern in accordance with the known behavior of the unequal-path interferometer. It can be seen, therefore, that by proper utilization of the polarity of the signal delivered to the servo-motor 6, that a corrective action can be secured and that fringe angle errors as indicated by the signal on line 57 will be reduced to an extent depending upon the loop gain of the corrective system that can be achieved.

We will now consider the operation of the error loop that normalizes the curvature of the fringe pattern, that is to say the departure of the fringes from straightness. Again we will assume that all other errors are held to negligible values by the appropriate action of the three normalizing servo-loops already described. Curvature of the fringe pattern will cause the one megahertz video signal on line 34 to be phase modulated by the vertical deflection waveform squared. If the curvature of the fringes is such that the phase errors at the top and the bottom of the rasters exceeds about 90 degrees then the correlating system will probably not be operable. As described for previous normalizing functions, however, once correlation has been achieved the corrective action of the fringe curvature servo will hold fringes nearly straight so that phase shifts of more than a few degrees at the extremes of the raster are unlikely. We will consider first that fringe curvature is present in such a direction that the phase of the video signal on line 34 is lagging with respect to the reference signal on line 31 at both the top and the bottom of the raster. Owing to the corrective action of the fringe translation servo the average phase error over the raster must be close to zero, therefore under the conditions just described the phase of the video signal on line 34 must be leading with respect to the reference signal on line 31 when the scanning spot is near the vertical center of the raster. Considering multiplier 44 it will be seen that the input signals to this multiplier are the vertical deflection waveform squared on line 47*a*, and the X parallax signal on line 36. When the scanning spot is at the top of the raster the signal on line 47*a* will be positive representing the square of the positive vertical deflection signal. When the scanning spot is at the bottom of the raster the signal on line 47*a* will again be positive representing the square of the negative instantaneous value of the vertical scanning waveform on line 18. When the scanning spot is near the center of the raster the signal on line 47*a* will be zero representing the square of the vertical scanning waveform which will also be zero. Owing to the use of AC coupling between the squaring circuit 47 and the multiplier 44, the instantaneous value of the signal on line 47*a* will go negative when the scanning spot is near the center of the raster, positive when the scanning spot is near the top or the bottom of the raster, and will pass through zero when the scanning spot is at some intermediate level in both the upper and lower halves of the raster.

Under the fringe curvature conditions just described the output of the multiplier 32 is positive when the spot is at the top and the bottom of the raster and negative when the spot is near the center of the raster. Under these conditions the output of the multiplier 44 on lines 50*a* and 50 will be positive at all times corresponding to the multiplication of quantities having the same sign. If the fringe curvature were of the opposite sense than just described, so that the signal on line 34 was lagging when the spot is at the top or bottom of the raster and leading when the spot is near the center of the raster, then the polarity of the X parallax signal on line 35 would at any instant be opposite to the signal on line 47*a*. Under these conditions the polarity of the signal on lines 50*a* and 50 would be negative corresponding to multiplication of signals having opposite polarity. Since the multiplier 44 is proportional in its action and since the deflection waveform squared on line 47*a* is constant in amplitude, the error signal on line 50 will be proportional in amplitude and polarity to the magnitude and direction of the fringe angle error. The signal on line 50 is smoothed by the integrating circuit 53 and a smoothed error signal representing curvature of the fringes is delivered by line 56 to a servo amplifier not shown. The servo amplifier drives the Z servo-motor 7 causing the interferometer to move linearly along its optical axis. Such motion of the interferometer with respect to the object under test produces a change in the curvature of the fringe patterns in accordance with the known operation of the unequal path interferometer. It can be seen, therefore, that by proper attention to the polarity of the signal delivered to the servo-motor 7 that a corrective action can be secured and that fringe curvature as indicated by the signal on line 56 will be reduced to an extent depending upon the loop gain of the corrective system that can be achieved. Motion of the interferometer along its Z axis produces a variation in fringe pitch across the pattern, in addition to the curvature of the fringes just described.

An alternative method of sensing normalizing errors in the Z direction is to compare the X parallax signal with the square of the instantaneous value of the horizontal deflection signal. It can be shown that an error signal derived from the multiplication of these two signals would be a measure of the change in pitch of the fringes across the scanning raster. Such an error signal may be smoothed and used to actuate the Z servo-motor via AND gate 80 and would be just as effective in adjusting the Z axis of the interferometer as the curvature sensing method described in the previous paragraph. A preferred method of correcting errors in the Z position of the interferometer is to sense both pitch change across the raster, and curvature of the fringes to sum both error signals together to serve as a combined error signal for the actuation of the Z motion. By using both fringe curvature and pitch variation to sense the need for Z adjustments, ambiguity in the interpretation of mirrors having cylindrical surface errors is avoided. It can be shown that the relationship between fringe curvature and pitch variation caused by a cylindrical mirror is opposite to that produced by errors in Z positions. By using the sum of the two errors to control the Z position, it is therefore possible to cancel out any curvature error which may exist and which would not otherwise be correctly read out.

The squaring circuit 81 and multiplier 82 sense the variation in fringe pitch as just described, delivering a pitch variation signal on line 50*b*. This signal is summed with the fringe curvature signal on line 50*a* in the summary point 80 to provide a combined Z error signal on line 50.

As mentioned earlier there is a problem in initialing correlation since the presence of large uncorrected error disables the entire correlation operation. It is proposed, therefore, that a gate 59 be inserted in the output line from the video correlator and that the gate be actuated by the scanning waveforms in such a way that the correlator is only operative initially over a very small central portion of the raster. The multiplier 60 operating on the horizontal and vertical scanning waveforms, and the amplitude discriminator 61 actuate the gate through line 62 in such a manner that the gate is enabled whenever the scanning spot is in central region. By adjusting the threshold value of the amplitude discriminator 61, the size of the active patch within the raster may be adjusted as required. The setup procedure would be as follows: the laser interferometer will be setup manually to provide a rough approximation of the required fringe pattern. The threshold setting of the trigger or amplitude discriminator 61 is adjusted to provide an active patch in the center of the raster of about 2 or 3 fringes square. The fringe translation servo would now be activated allowing phase-lock between the video and reference waveform. The X and Y servo would now be activated allowing the rough normalization of pitch and slope. The threshold of the amplitude discriminator could now be changed to increase the correlating area within the raster. The increase in active error would be made slowly and reversed if instability of any of the normalizing loops became evident. At some point during this expansion the Z servo would be activated allowing the normalization of curvature and finally the Gestalt integrator system, to be described, would be activated to account for fringe irregularities. Expansion of the active area being correlated would continue until the entire raster would be active.

We will now consider the operation of the Gestalt integrator in the compensation for the effect of fringe irregularities on correlation, and in the reading out of error data represented by such fringe irregularities. Fringe. irregularities cause transient phase shifts between the video signal on line 34 and the reference signal on line 31. Such transient shifts will be sensed by the multiplier 32 and will become manifested as irregularities in the X parallel signal on line 35. After completion of normalization as described, the parallax signal on line 35 will consist almost entirely of undulations representing such irregularities since the error signals for fringe pitch, angle, and curvature will have been reduced to a very low value through the action of the aforesaid correction loops. Since the correlator will not function satisfactorily if any error exceeds about 90°, it is clear that the phase errors arising out of irregularities can disturb correlation and render the normalizing system inoperative. It is proposed that the scanning raster be modified in shape by electronic means, to accommodate fringe irregularities in a closed loop fashion similar to the action of the normalizing systems just described.

An obvious way of accommodating fringe irregularities is to change the instantaneous position of the scanning spot in the X direction in response to transient X parallax signals on line 35. For example, if the scanning spot were to encounter fringes which were displaced to the right of their normal position with respect to the rest of the fringe pattern, then a phase shift will occur between the video signal on line 34 and the reference signal on line 31 that has already been normalized to the average fringe pattern. The phase shift will cause an X parallax signal to appear on line 35 as already described. If now this X parallax signal were to be amplified and applied to the X deflection system of the TV camera tube then the scanning spot may be shifted in the X direction so as to reduce the phase error existing between signals upon lines 34 and 31. If this action could occur fast enough it is clear that irregularities in the fringe pattern would be compensated by irregularities in the X scanning waveform so that phase shift on line 34 would be reduced by an amount depending upon the loop gain that could be achieved. It would be possible in such a system to readout the irregularities in the X scanning waveform and to translate such irregularities into corresponding perturbations of the optical surface under test.

There are several reasons why an "instantaneously" operative X parallax system such as that just described might be unsatisfactory in practice. Firstly, it is difficult to complete the operation of sensing phase perturbations on line 34 quickly enough for the correction signal to be made available before the scanning spot has moved onto another area of the raster. The delay in the sensing of phase occurs principally as a result of the band pass filter in the input to the video correlator, and the low pass filter in the output, that are necessary to remove noise. The amount of filtering required for this purpose of course depends upon the signal/noise ratio that exists on line 34. Operation at high light levels and at high fringe contrast improves signal noise ratio and allows reduction of the time delays in the band pass and low pass filters. Also present in the output of the video correlator are double video-frequency components that must also be filtered from the X parallax signal in order to avoid anomalous displacement of the scanning spot. By employing a balanced video correlator design known in the art, and by carefully adjusting the symmetry of the multipliers, it is possible to reduce the double video-frequency noise in the output of the video correlator to a very small value.

I conclude, therefore, that it may be possible for an "instantaneous" X parallax system to work as described and to provide an instantaneous signal representing the observed error at any point of the mirror surface. A second possible limitation of an "instantaneous" X parallax system is that the resultant error signal is not averaged either in time or in area on the mirror surface, so that noise, either of the type just described or arising out of atmospheric turbulence or vibration of the interferometer or the mirror, is not smoothed by any averaging process whatever. It is the purpose of my "Gestalt" integrator to provide a smoothed X parallax signal to the deflection system of the TV camera tube, that represents at any instant the X parallax for the area being scanned averaged over many frames in time and over an area of several scanning spot diameters.

A two-gun cathode ray storage tube such as the RCA "Graphicon" tube is used as a two-dimensional integrator. The X parallax signal on line 35 is amplified by driver amplifier 60*a* to provide an amplified X parallax signal that is delivered by means of line 61*a* to the grid of writing gun 62*a* of storage tube 27. The output signal from tube 27 resulting from the reading operation is delivered via line 63 to preamplifier 64 and thence by line 65 to summing device 66. The output signal on line 65 is called the ΔX signal and it contains the information on mirror surface perturbation, that is to be read out. The ΔX signal on line 65 is added to the X deflection signal on line 19 by summing device 66. The combined signals are fed through amplifier 79 to the X deflection coil of the TV camera tube. The loop gain of the system is high enough so that the ΔX signal will have a value just adequate to correct the position of the scanning spot in the X direction to account for irregularities in fringe patterns.

The deflection coils 26 and 25 of the reading and writing guns of the storage means 27 are each driven by the horizontal and vertical waveforms on lines 17 and 18. Integration in tube 27 is provided by charges built up in the target and it will be seen that each incremental area of the raster will build up a charge that is independent of that built up in all other incremental areas. Synchronous operation of the reading and writing deflection systems assure that the average signal available at any instant on output line 63 results from the averaging of the signal on line 61*a* over many previous frames. Delay circuits 68 and 69 are inserted in the vertical and horizontal deflection lines feeding the writing gun deflection coil 25. The purpose of delays 68 and 69 is to compensate for delays in the correlation system so that the X parallax signal on line 35 will be written in at the proper location on the target at any instant even though significant delays in the video correlator or other circuitry may occur.

I have described the action of the storage tube 27 in providing time averaging of the X parallax signal. Area averaging is accomplished simultaneously by operating tube 27 with at least one scanning gun in an unsharp focus condition. It may be desirable to control the averaging area either manually or automatically in response either to the lateral resolution required for the measurements on the mirror, or to suppress high resolution during the closure of the feedback loops for the first time.

The waveform on output line 65 is an analog of the irregularities of the mirror surface taken in the direction of scan. There are several methods of reading out this fluctuating voltage. The display cathode ray tube 24 presents a rough indication of surface errors on the mirror. The horizontal and vertical deflection waveforms on lines 17 and 18 are delivered to the deflection coils of display cathode ray 24 to produce a raster on the face thereof similar to that in the TV camera tube. The $\Delta X$ signal on line 65 is amplified by means of amplifier 70 and the amplified $\Delta X$ signal is delivered to the grid of CRT 24 through line 71. The $\Delta X$ signal thereby modulates the intensity of the electron beam of display cathode ray tube 24 to produce a topographic map in which varying intensities are related to departure of the mirror surface from its ideal shape. Such a display device is very useful for setting up the apparatus and for assuring that correlation is occurring during the closure of the loops. It is also useful for achieving a visual impression of mirror surface irregularities and malfunction of the correlating interferometer. A second storage tube 29 is used as a scan converter to make the $\Delta X$ signal available for any point in the raster on command rather than sequentially as it occurs on line 65. The reading gun deflection coil of tube 29 is driven by the horizontal and vertical deflection signals on lines 17 and 18. The $\Delta X$ deflection signal is amplified by amplifier 72 and delivered by line 73 to the grid of the writing gun 74 of tube 29. The deflection coil 75 of the reading gun of tube 29 is driven by external X and Y deflection signals thereby to read out on command any point in the raster. The readout signal corresponding to the point selected is available on line 76 from the preamp 77 which amplifies the output signal from tube 29.

The relationship between the $\Delta X$ signal and the corresponding fringe deviation is only dependent upon the linearity of the X deflection system in the TV camera tube. By careful design of the deflection yoke for the camera tube linearities of better than 1% will be attainable. Other readout methods will occur to one skilled in the art and a system using voltage or current comparators to determine spot position of X and Y is feasible which may utilize a series of AND circuits to determine the value of the $\Delta X$ signal at corresponding instants of time. A matrix of such comparators and gates could be built up so that the surface perturbations may be presented to whatever degree of fineness one may deem necessary.

The waveshape generator need not be an oscillator but could comprise means to scan with a spot of light a transparency bearing a reference interference pattern optically coupled to a photocell for producing the reference waveshape. Also the scanning means could comprise a mechanically actuated light beam coacting with a photocell for detecting reflectivity changes, rather than a television camera tube.

Obviously many modifications and variations of the present invention are possible in the light of the above teachings. It is therefore to be understood, that within the scope of the appended claims, the invention may be practiced otherwise than as specifically described.

I claim the following:

1. A correlation system comprising:

(a) means for producing an interference pattern having a two-dimensional cyclically varying image pattern;

(b) a scanner for scanning said cyclical image pattern within a scanning field for producing a first cyclical signal corresponding to said pattern;

(c) a wave-shape generator for producing a second cyclical reference signal;

(d) a correlator for correlating said first and second cyclical signals; and (e) error indicating means coupled to said correlator for producing a plurality of signals indicative of phase shifts between said first and second cyclically varying signals occurring at various coordinate positions over said scanning field to indicate variations of said pattern from a standard established by said second cyclical signal produced by said wave-shape generator.

2. The combination as set forth in claim 1 wherein said wave-shape generator produces a signal having a frequency which is a multiple of the scanning frequency of said scanner.

3. The combination as set forth in claim 1 further including an optical element and an interferometer optically coupled to said optical element for producing said interference pattern indicative of the orientation in space of said optical element.

4. The combination as set forth in claim 2 further including an optical element and an interferometer optically coupled to said optical element for producing said interference pattern indicative of the orientation in space of said optical element.

5. The combination as set forth in claim 3 further including actuator means coupled to said optical element for altering the orientation of said optical element in space and actuator drive means coupled between said error indicating means and said actuator means for altering the orientation of said optical element to eliminate the variations of said interference pattern from said standard established by said second cyclical signal.

6. An automatic correlating interferometer comprising:

(a) an optical element;

(b) an interferometer for producing an output interference pattern indicative of the orientation in space of said optical element;

(c) a scanner for scanning said interference pattern and for producing a first signal indicative of said pattern;

(d) a wave-shape generator for producing a second cyclical signal;

(e) a correlator for correlating said first and second signals;

(f) a distortion analyzer coupled to said correlator for producing error signals indicative of variations between a standard interference pattern synthetically represented by said second cyclical signal and the interference pattern scanned by said scanner, and (g) normalizing means coupled between said distortion analyzer and said interferometer for normalizing said interferometer until the error signals are substantially eliminated.

7. The combination as set forth in claim 6 wherein said distortion analyzer includes logic means for producing an error indicative of the pitch discrepancy between said standard interference pattern and said output interference pattern.

8. The combination as set forth in claim 6 wherein said distortion analyzer includes logic means for producing an error signal indicative of angular discrepancy between said standard interference pattern and said output interference pattern.

9. The combination as set forth in claim 6 wherein said distortion analyzer includes logic means for producing an error signal indicative of curvature discrepancy between said standard interference pattern and said output interference pattern.

10. The combination as set forth in claim 6 wherein said distortion analyzer includes first logic means for producing a first error signal indicative of pitch discrepancy between said standard interference pattern and said output interference pattern, and wherein said distortion analyzer includes second logic means for producing a second error signal indicative of angular discrepancy between said standard interference pattern and said output interference pattern, and wherein said distortion analyzer includes third logic means for producing a third error signal indicative of the curvature discrepancy between said standard interference pattern and said output interference pattern.

11. The combination as set forth in claim 6 wherein a raster generator, controlled by said wave-shape generator is coupled between said scanner and said wave-shape generator to control the scanning rate of said scanner.

12. The combination as set forth in claim 10 further including means for applying the output of said raster generator to said distortion analyzer to produce signals to facilitate the generation of said error signals.

13. The combination as set forth in claim 6 further including storage means for storing, at a plurality of coordinate points, a second group of higher order X parallax error signals between said standard interference pattern and the interference pattern scanned by said scanner remaining after the operation of said normalizing means.

14. The combination as set forth in claim 13 further including means for displaying said higher order errors thereby to produce a map of said higher order errors corresponding to surface irregularities upon said optical element.

15. The combination as set forth in claim 13 wherein said storage means integrates higher order X parallax error signals applied thereto over a plurality of scanning frames generated by said scanning means.

16. The combination as set forth in claim 15 wherein delay means are coupled to the error signal input circuit of said storage means so that higher order X parallax error signals will be stored at coordinates in said storage means corresponding to locations with the scanning field in which they actually exist.

17. The combination as set forth in claim 16 further including a scanning beam for writing said higher order errors into said storage means and means for maintaining said scanning beam in an unsharp focus condition to provide for area averaging.

18. The combination as set forth in claim 13 further including means coupled between said storage means and said scanning means for modulating the scanning velocity of said scanning means in accordance with said X parallax error signals stored within said storage means.

19. An active optical element control system comprising:

(a) an optical element;

(b) first means for examining the actual orientations in space of various portions of said optical element;

(c) second means for generating reference information representing desired predetermined orientations in space of said various portions of said optical element;

(d) third means coupled to said first and second means for generating error signals indicative of discrepancies between said actual orientations in space of said various portions of said optical element and said predetermined orientations in space of said various portions of said optical element, and;

(e) actuator means, coupled between said optical element and said third means, for deforming said optical element to change the orientations in space of said various portions of said optical element in a manner which tends to eliminate said error signals.

20. The combination as set forth in claim 19 wherein said first means includes means for producing an interference pattern indicative of the actual orientations in spaces of various portions of said optical element.

21. The combination as set forth in claim 20 wherein said first means further includes a scanner for sequentially scanning various coordinate points of said interference pattern.

References Cited

UNITED STATES PATENTS

| | | | |
|---|---|---|---|
| 3,012,467 | 12/1961 | Rosenthal | 356—83 |
| 3,310,877 | 3/1967 | Slater | 356—149 |

RONALD L. WIBERT, Primary Examiner

C. CLARK, Assistant Examiner

U.S. Cl. X.R.

356—109, 110